United States Patent [19]
Fletcher et al.

[11] 3,821,102
[45] June 28, 1974

[54] APPARATUS FOR CONDUCTING FLOW ELECTROPHORESIS IN THE SUBSTANTIAL ABSENCE OF GRAVITY

[76] Inventors: James C. Fletcher, Administrator of the National Aeronautics and Space Administration with respect to an invention of; Richard N. Griffin; Louis R. McCreight, both of Wayne, Pa.

[22] Filed: May 31, 1972

[21] Appl. No.: 258,171

[52] U.S. Cl. ............................. 204/299, 204/180 R
[51] Int. Cl. ............................................. B01k 5/00
[58] Field of Search ............ 204/180 R, 180 G, 299

[56] References Cited
UNITED STATES PATENTS 3,509,035   4/1970   Huebner ........................ 204/180 R
3,563,872   2/1971   Huebner ........................ 204/180 R

*Primary Examiner*—Howard S. Williams
*Assistant Examiner*—A. C. Prescott
*Attorney, Agent, or Firm*—L. D. Wofford, Jr.; G. J. Porter; J. R. Manning

[57] ABSTRACT

A zero-g, constant-flow electrophoretic separating apparatus comprising a deflecting member to spread carrier fluid across a conduit, separation electrodes spaced apart along the conduit, and an end wall with a valve located in the conduit past the separation electrodes from which layers of carrier and sample may be extracted. Electrode electrolyte is separated from the carrier and continually circulated and cleaned.

9 Claims, 3 Drawing Figures

PATENTED JUN 28 1974　　　　　　　　　　　　3,821,102
FIG.1.
FIG.2.
FIG.3.
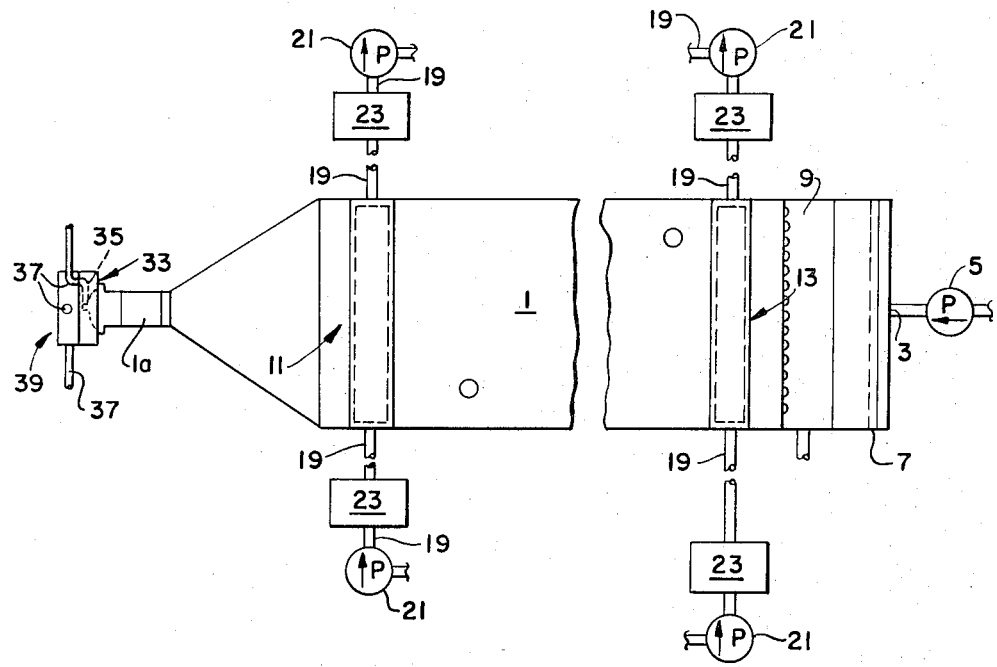
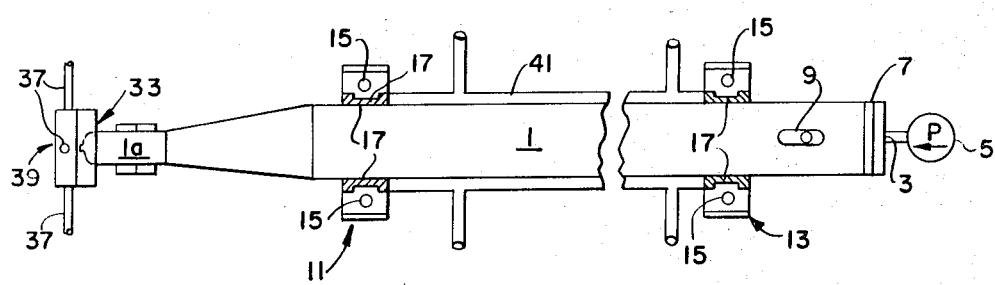
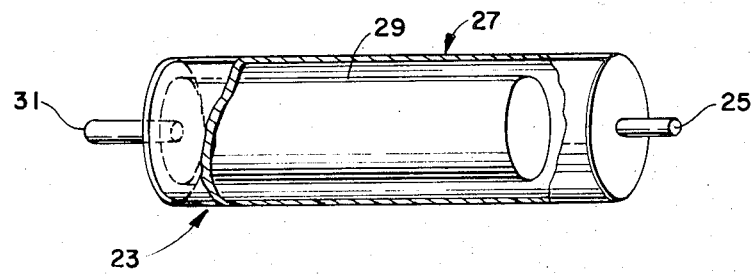

3,821,102

APPARATUS FOR CONDUCTING FLOW ELECTROPHORESIS IN THE SUBSTANTIAL ABSENCE OF GRAVITY

ORIGIN OF THE INVENTION

The invention described herein was made in the performance of work under a NASA contract and is subject to the provisions of Section 305 of the National Aeronautics and Space Act of 1958, Public Law 85-568 (72 Stat. 435; 42 U.S.C. 2457).

BACKGROUND OF THE INVENTION

This invention relates to electrophoretic movement induced in fluids and, more specifically, to systems for electrophoretic separation or fractionation in fluids, especially free-flow systems in the absence of gravity.

Electrophoresis in general is the phenomenon of migration of charged particles or ions in an electrolyte medium under the influence of an electric field. The phenomenon is used to separate small particles, which, because of surface properties involving interaction with the medium or other characteristics, exhibit distinguishing charge characteristics.

A great variety of equipments and procedures are used in the conduct of electrophoresis, depending on the purpose and scale of the desired product and on the physical and chemical nature of the sample. Electrophoresis separation procedures can be conveniently distinguished as free (sometimes termed free boundary or moving boundary) or zone. The zone procedures are characterized by the presence of a flow stabilizing structure in the flow path of the carrier electrolyte, including gels, powders, beads, granules and laminations such as paper and acetate coatings and sheets.

Free procedures are characterized by unobstructed, non-turbulent flow of the carrier electrolyte, which may be microscopic flow, density gradient flow, or laminar flow, laminar flow being most suited to the handling of relatively large samples.

Conventional, free-liquid-flow systems are greatly impaired by the inherent thermal convection and sedimentation of such systems. These effects are minimized by miniaturizing the apparatus and also by using any of the many ingenious methods which have been developed to attempt to overcome these difficulties, such as verical upward flow and vertical serpentine flow.

It has been previously well recognized in the art that the best way to avoid convection and sedimentation is by elimination of gravitational forces as, for instance, in a spacecraft. However, no electrophoresis separation apparatus is known which is basically suitable for operation in the absence of gravity. Although the disadvantages of gravity are recognized and certain design features are known to reduce the disadvantages, gravity is also necessary to aspects of the operation of known systems. In some systems, gravity provides the flow to the buffer. In others, gravity is used in the collection of samples and in keeping them in their respective containers, and gravity produces the necessary separation of unwanted gases, including air or electrolysis products, from samples, buffers, and electrolytes.

SUMMARY OF THE INVENTION

It is a primary object of this invention to provide a free-flow electrophoresis system particularly suited to be used at zero or very low levels of gravity.

It is, similarly, a primary object of this invention to provide a non-turbulent flow system in which carrier electrolyte is moved and separated samples are extracted without reliance upon environmental gravity.

It is a more specific object of this invention to provide a continuous, free-flow electrophoresis system for operation at zero or very low levels of gravity.

In accordance with this invention a conduit is provided in a zero g system through which a carrier electrolyte is passed under pressure. Separation electrodes are spaced apart along the conduit. The electrolyte is dispersed across the conduit so that the flow is non-turbulent. Two or more exit ports are located in the conduit past the separation electrodes and are part of a valve system to select the desired port to extract layers of elements of samples separated in the carrier.

In the preferred embodiment electrolyte in the chambers of the separation electrodes is held separate from that in the main conduit by a semi-permeable material, and that electrolyte is purified by being passed between two permeable members, one hydrophylic and one hydrophobic. Such a system of purification is basically conventional in prior electrophoresis systems.

BRIEF DESCRIPTION OF THE DRAWINGS

FIG. 1 shows the system from one side in section.

FIG. 2 is a view of the system shown in FIG. 1, also in section, from an angle of 90° from that point of view of FIG. 1.

FIG. 3 is a perspective view, partially in section, showing a chamber to separate impurities found in the electrode electrolyte.

DESCRIPTION OF THE PREFERRED EMBODIMENT

The preferred system is shown from views differing by 90° in FIGS. 1 and 2. The exact shape or dimensions of the conduit 1 of the apparatus are not critical; inside dimensions of 1 × 10 × 50–100 cm are effective. The shape could equally well be cylindrical, or, for a more compact design, could be folded, coiled, or spiralled, the essential criterion being that laminar flow can be maintained in the conduit. Conduit 1 may be composed of any electrically non-conductive material, glass or transparent plastic usually being preferred.

Main conduit 1 diminishes to a smaller, neck 1a at one end and is operatively connected to an inlet port 3 at the other end.

Suitable buffered electrolyte (referred to as "buffer" or "carrier" to distinguish it from the electrolyte in the separation electrode compartments) is forced under pressure by pump 5 into inlet 3. (For a more evenly distributed flow, it may be advantageous, in some cases, to have several such inlets 3 spaced across the end of the main conduit 1.)

The buffer first flows through diffuser 7. Diffuser 7 is a sheet of sintered or porous glass, or similar mechanical flow control element positioned across the diameter of duct 1.

Spaced down the flow path from diffuser 7 is the sample injector 9, which is shown as a conduit positioned in the center of conduit 1 and extending across the large diameter of duct 1, with a series of exit holes located at evenly spaced points across the entire diameter. The sample, which may in one important possible application be a biological sample to be separated, is passed through injector 9 from the exit holes into the buffer.

One of the inventors of this invention has developed a sample insertion device particularly well suited for use in this system. That insertion system has two charged, conductive screens located in the main flow path, such as across duct 1. The sample is introduced between the screens and the charge on the screens is sufficient to disperse and hold the samples across the screens. (The screen nearest a separation electrode is charged in the same relative polarity as that electrode.) The samples are thereby uniformly distributed across the flow path and are freed for movement in the carrier by termination of the charge to the screens. The precision of sample element separation is improved. Additionally, a first separation by the charge properties of elements of the samples has been accomplished by the screens before the samples are released. This constitutes a separate invention which is described and claimed in Application Ser. No. 260,093 filed July 6, 1972 of Louis R. McCreight, titled Electrophoretic Sample Insertion.

The desired insertion of sample is to provide an even band across conduit 1. Sample mixture is injected at separated time intervals, generally as frequently as possible without experiencing mixing of samples.

The separation electrodes 11 and 13 are positioned in communication with conduit 1 past sample injector 9, spaced from one another. The electrodes 11 and 13 are of conventional design and may be of a reversible type or of carbon or of a noble metal. In each case, the electrical elements 15 are in chambers which are separated from the main electrophoresis conduit 1 by an ion-permeable material or membrane 17, which forms the side of the electrode assembly contiguous with the long diameter of duct 1. Accordingly, electrodes 11 and 13 are positioned on the sides of duct 1 where they do not introduce turbulence into the flow. Their electrically effective length covers substantially the full long diameter of duct 1.

Certain of the electrolyte ions pass walls 17 to provide the necessary closed electrical circuit, but the walls 17 block larger elements from passing between duct 1 and the inside of the chambers of electrodes 13 and 11. The material of wall members 17 may be a porous glass or plastic, a film such as those widely used as dialysis membranes, or a supported layer of a material such as agar gel. The choice of material depends, at least in part, on whether the fluid in the chambers of electrodes 11 and 13 and the carrier electrolyte have the same or different major components.

The chambers of electrodes 11 and 13 are continually rinsed with a flow of electrolyte, which serves to remove electrolysis products from the chambers before they can migrate into the electrophoresis chamber. The continuous rinsing also serves to minimize changes of pH and other characteristics in the conduit 1 where electrophoretic separation is taking place.

A conduit 19 connects the two chambers of electrodes 11 and 13 in a closed loop. Pumps 21 are situated in conduit 19 to provide the force for circulating the electrolyte. A phase separator 23 is located at the inlet and the outlet of each chamber of electrodes 11 and 13, at which products developed during operation are eliminated so that the electrolyte is cleaned. Preferably, the loop including conduit 19 has a reservoir or other fluid store. Electrolyte from the electrode 13 is passed through the separators 23 and then to electrode 11, through conduit 19. Electrolyte from electrode 11 is circulated to electrode 13, and so on in a repeating loop.

The phase separator 23 is shown in detail in FIG. 3. The mixture of electrolyte and gaseous electrolysis products enters separator 23 from a reservoir through port 25. In the device the gases pass through a hydrophobic outer membrane 27 and the liquid passes through a hydrophilic inner membrane 29. Passage through inner membrane 29 leads to the exit port 31 and, after exit, to a reservoir. These separators are standard commercial items.

The pumps 21 preferred are so-called peristaltic pumps, in which motor-driven cams squeeze flexible tubing against a back plate, in a manner which advances fluid flow. Since the continuity of the passage through the tubing is always interrupted by one or another of the cams which squeeze it shut at its locale of contact, they automatically break the otherwise continuous electrical path through the conduit 19. They are standard commercial items and have the other advantage that cleaning and sterilizing of the conduit 19 automatically accomplishes the same result for the pump.

Extraction valve 33 is a rotary valve formed as part of neck 1a in the main flow path 1 beyond separation electrodes 11 and 13. The end wall of neck 1a, which blocks the end of conduit 1, contains only one channel 35. Neck 1a is rotatable to connect the channel 35 with a selected one of several output conduits 37, located on a stationary member 39 positioned immediately past the end wall of neck 1a. Four output conduits 37 are indicated in FIGS. 1 and 2, but more or less than four are provided depending upon the precision of the separation being conducted. One of the conduits 37 leads to the buffer recirculation system so that the buffer can be recycled during periods when no sample is extracted. (The recirculation system might consist simply of tubing to return the buffer to a reservoir from which it is circulated, or, if necessary, the buffer might be passed through an ultra filter or even a still, and then reconstituted by the controlled addition of additives to achieve the desired pH and other characteristics.

For repetitive use, as in the preparation of significant quantities of sample components, it would be advantageous to automate the operation of the extraction valve 33. An optically transparent port may be provided adjacent the valve entrance through which sample component bands can be detected by standard methods (for example, refractive index change or ultraviolet absorption), such detection being the control signal to automatically index the valve to any one of the several outlet ports.

Side chambers 41 are cooling chambers, for maintaining the temperature of the materials in the chamber 1 substantially constant regardless of heat created by the electrical effects. The chambers 41 can, of course, also be used as heating chambers as desired. Such temperature control is basically conventional.

In operation, pump 5 continuously forces a buffered, carrier electrolyte through duct 1. At the same time pump 21 continuously circulates an electrolyte through the chambers of electrodes 11 and 13, and through the phase separator (cleaning apparatus) 23 (FIG. 3).

Electrical elements 15 are connected to a dc potential so that an electrical field appears across electrodes 11 and 13 of sufficient magnitude to produce a separation of elements in a sample into layers related to the characteristics of movement of the elements in an electrical field.

Sample is injected periodically by injector 9, which places the sample approximately evenly across the diameter of main conduit 1. Buffer from inlet port 3 is dispersed approximately evenly by diffuser 7, and the buffer entrains the sample in the vicinity of injector 9 as the buffer moves through conduit 1. Injector 9 does not greatly interfere with the flow of buffer, and therefore buffer flow further down the flow path in duct 1 is laminar and otherwise non-turbulent.

Sample mixture is generally injected as frequently as possible without mixing of the batches of samples occuring. When the sample mixture band or layer, carried by the flowing buffer carrier, enters the dc field of electrodes 11 and 13, it is separated electrophoretically into individual bands of various constituents. The rate of motion of each element in the sample is the algebraic sum of its electrophoretic motion and the buffer flow rate through duct 1.

When each component element approaches valve 33, the elements have been separated into bands across the width of duct 1. Valve 33 is rotated so as to connect channel 35 with the outlet conduit 37 selected to receive the component. As different bands of component reach valve 33, neck 1a is rotated to connect channel 35 to a different conduit 37. When no sample component is being extracted, the carrier is recirculated. Valve 33 may be operated automatically, such as in response to optical sensing of the presence of the different bands.

Operation is at very low or zero gravity, so that the problems of convection and sedimentation are eliminated. Should this absence of gravity cause a problem with respect to some desired characteristic or feature, alternatives are often available and, in space, microgravity and simulation of gravity are readily available.

Variations of the invention described will be apparent, and variations may well be developed which employ more than ordinary skill in this art, but nevertheless employ the basic contribution and elements of the invention. Accordingly, patent protection should not be essentially limited by the preferred embodiment disclosed, but should be as provided by law, with particular reference to the accompanying claims.

What is claimed is:

1. An electrophoresis separation apparatus comprising a main channel, a pump to move carrier electrolyte through said channel in a non-turbulent flow, electrodes for electrophoretic separation of sample elements in said carrier located at positions spaced along said channel, and a valve located on the flow path of said carrier past said electrodes movable to direct liquid from said channel selectably to at least two output conduits, said valve comprising a moveable member covering an end of said channel.

2. The apparatus as in claim 1 in which said moveable member on said valve has a channel, and said valve comprises an adjoining, relatively stationary member having at least two channels, said movable member being movable to operatively connect the channel of said movable member selectably to each of said at least two channels of said stationary member.

3. The apparatus as in claim 2 in which said movable member is rotatable.

4. The apparatus as in claim 3 also comprising at least one member adapted to physically disperse the carrier evenly across the diameter of said main channel located in said main channel prior to the location of the separation electrodes, and in which said separation electrodes are separated from said main channel by a material permeable to ions but not permeable to at least one other component which normally occurs in the electrolytes of said apparatus.

5. The apparatus as in claim 4 also comprising at least one electrolyte cleaning apparatus comprising two permeable members, one hydrophylic and one hydrophobic, and means to remove electrolyte from said electrodes and pass the removed electrolyte between said members and through said hydrophylic member back to at least one of said electrodes.

6. The apparatus as in claim 1 also comprising at least one member adapted to physically disperse the carrier evenly across the diameter of said main channel located in said main channel prior to the location of the separation electrodes, and in which said separation electrodes are separated from said main channel by a material permeable to ions but not permeable to at least one other component which normally occurs in the electrolytes of said apparatus.

7. The apparatus as in claim 6 also comprising at least one electrolyte cleaning apparatus comprising two permeable members, one hydrophylic and one hydrophobic, and means to remove electrolyte from said electrodes and pass the removed electrolyte between said members and through said hydrophylic member back to at least one of said electrodes.

8. The apparatus as in claim 2 also comprising at least one member adapted to physically disperse the carrier evenly across the diameter of said main channel located in said main channel prior to the location of the separation electrodes, and in which said separation electrodes are separated from said main channel by a material permeable to ions but not permeable to at least one other component which normally occurs in the electrolytes of said apparatus.

9. The apparatus as in claim 8 also comprising at least one electrolyte cleaning apparatus comprising two permeable members, one hydrophylic and one hydrophobic, and means to remove electrolyte from said electrodes and pass the removed electrolyte between said members and through said hydrophylic member back to at least one of said electrodes.

* * * * *